3,366,754
ROTATABLE PRIMARY ELEMENT FOR LEVEL DETECTION PROVIDED WITH SEALED BEARING MEANS

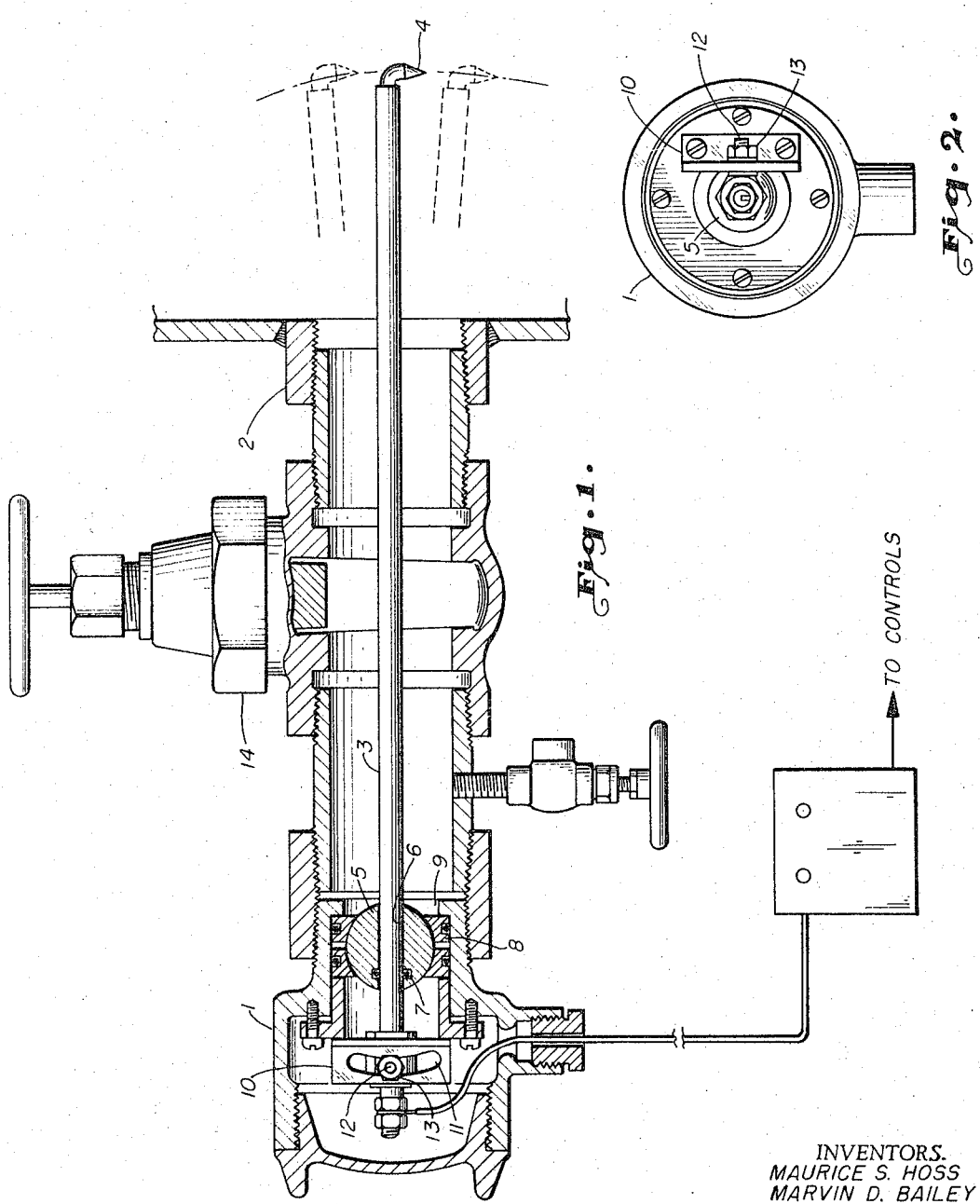

Maurice S. Hoss and Marvin D. Bailey, Tulsa, Okla., assignors to Combustion Engineering, Inc., New York, N.Y., a corporation of Delaware
Filed Mar. 4, 1966, Ser. No. 531,986
3 Claims. (Cl. 200—61.2)

The present invention relates to the support of an electrode as a primary element sensing the level of fluid material.

Elongated electrodes have been arranged to sense the presence of fluid levels by actuating electric circuits in which the electrodes are included as the level of the fluid reaches the electrodes. The present problem comes about when it is desired to pivot an electrode about a fulcrum between its ends to place its active end at a predetermined height. A problem descends in providing a seal between the exterior and interior of a fluid container which seal permits the desired pivoting between the ends of the electrode. Also, while the electrode is pivoted, it must have the vertical position of the active end of the electrode indexed and fixed in elevation as desired. Finally, the active end of the electrode collects foreign matter which must be removed. There is a problem in removing this material while keeping the vessel sealed.

An object of the invention is to pivot an electrode to place its active end at a desired elevation while keeping its vessel sealed.

Another object is to index the elevation of the active end of the pivoted electrode and fix the height of such end.

Another object is to remove, and insert, the electrode from its vessel without breaking the seal of the vessel.

The present invention contemplates an elongated electrode with an active end extending into a vessel with which to detect the level of fluid in the vessel. The electrode is mounted in the wall of the vessel by a spherical element and seal which provides a pivot for elevating the active end of the electrode. A bracket at the end of the electrode which is external the vessel provides a reference for determining the height of the active end and means through which to fix the height as desired. A conduit and valve between the pivot and the vessel provides a means for withdrawing the electrode for cleaning without breaking the seal of the vessel.

Other objects, advantages and features of this invention will become more readily understood by one skilled in the art upon consideration of the written specification, appended claims, and attached drawings, wherein:

FIG. 1 is a partially sectioned side elevation of a probe and pivot structure embodying the present invention; and FIG. 2 is an end elevation of the structure of FIG. 1.

FIG. 1 discloses a housing 1 connected to a conduit 2 which, in turn, is connected to a vessel in which there is a fluid with a level to be detected. Electrode 3 is the primary element which specifically engages the surface sensed. Electrical apparatus not shown is connected to the electrode to determine the completion of the electrical path through the electrode 3 and fluid contacted by the electrode. The circuit then registers the contact as an indication of the height of the surface of the level contacted. There remains the problem of positioning the tip 4 of electrode 3, indexing the height and fixing the height.

Electrode 3 is pivoted at a point intermediate its ends. Ball 5, as a spherical structure, has a hole 6 formed through its center, large enough to receive the electrode 3. A seal 7 is provided between the hole 6 and the surface of electrode 3 to obviate leakage from the interior of the vessel.

Ball 5 is held within a seal structure 8 so ball 5 can be rotated while the seal across the unit is maintained. Seal structure 8 is mounted in a suitable position in housing 1, the electrode 3 extending from housing opening 9, through conduit 2 and into the vessel. Electrode 3 may be pivoted through partial rotation of ball 5 in its seal 8 to give the desired range of vertical elevations of tip 4.

The end of electrode 3 in housing 1 can be manually manipulated to pivot the electrode as desired. A bracket 10 is bolted to housing 1 and has an arcuate slot 11 formed thereon. The electrode 3 engages this slot 11 for guidance in its pivoting movement and in fixing its position.

A bolt 12 is extended at right angles from electrode 3, through slot 11. A nut 13 is threaded on this bolt 12 to tighten into engagement with bracket 10. When loosened, nut 13 permits manual pivoting of electrode 3 through the arc of slot 11. When nut 13 is tightened, the bracket 10 and electrode are locked together, fixing the height of the active end of the electrode at the indexed height.

This structure lends itself readily to removal of the electrode for cleaning without breaking the seal of the vessel. The housing end of electrode 3 can be disengaged from the housing 1 and electrode 3 can be withdrawn through the ball 5 until tip 4 is between ball 5 and valve 14. Valve 14 can then be closed and housing 1 removed to clean the electrode. Replacement of the probe merely requires reversal of this procedure.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A primary element for sensing fluid level, including,
    a housing member sealed to the wall of a fluid container and having an aperture opening into the vessel interior,
    a spherical member having an aperture therethrough,
    means sealed to the edges of said aperture and providing a bearing for said spherical member,
    an elongated electrode extended through the aperture of the spherical member and bent at the end from the horizontal axis of the electrode within the container to detect the liquid level within the container,
    and means for locking the housing end of the electrode within a range of vertical positions to set the container end of the electrode at a desired height within the container as the electrode pivots on the spherical member as a fulcrum.

2. The element of claim 1 in which the means for locking the housing end of the electrode comprises,
    a bolt extended from the electrode, a bracket fixed to the housing member and providing a slot through which the bolt extends, and a nut on the bolt capturing the bracket, whereby the nut may be tightened at any position along the slot to lock the electrode into position.

3. The element of claim 1 including, a conduit between the housing member and the container, and a valve in the conduit, whereby the electrode may be withdrawn from the container until the bent end is between the valve and the spherical member so the valve can be closed and the housing dismounted for cleaning the electrode without breaking the seal of the container.

References Cited

UNITED STATES PATENTS

| 2,154,292 | 4/1939 | Taliaferro | 74—18.1 |
| 2,625,593 | 1/1953 | Voorhies et al. | 340—244 |
| 3,087,341 | 4/1963 | Hults | 200—168 |

BERNARD A. GILHEANY, *Primary Examiner.*

R. COHRS, *Assistant Examiner.*